United States Patent [19]

Persson

[11] Patent Number: 5,330,284
[45] Date of Patent: Jul. 19, 1994

[54] APPARATUS FOR MOUNTING AND DISMOUNTING BEARINGS

[75] Inventor: Stig Persson, Katrineholm, Sweden

[73] Assignee: SKF Mekan AB, Hatrineholm, Sweden

[21] Appl. No.: 36,832

[22] Filed: Mar. 25, 1993

[30] Foreign Application Priority Data

Apr. 10, 1992 [SE] Sweden .................. 9201150-01

[51] Int. Cl.[5] .................. F16B 2/00; F16D 1/00
[52] U.S. Cl. .................. 403/370; 403/16; 29/253; 29/256; 29/898.07; 29/898.08; 29/893.2; 384/559
[58] Field of Search ............ 29/253, 256, 426.5, 29/898.07, 898.08, 893.2; 403/16, 365, 367, 368, 370, 371; 384/559, 584, 585, 510, 537, 538

[56] References Cited

U.S. PATENT DOCUMENTS

| 1,843,463 | 2/1932 | Tawresey . | |
| 2,467,819 | 4/1949 | Firth | 403/16 |
| 2,503,860 | 4/1950 | Williams | 403/16 |
| 2,505,215 | 4/1950 | Siegerist | 403/16 |
| 3,033,597 | 5/1962 | Miller . | |
| 3,909,046 | 9/1975 | Legris | 403/16 X |

FOREIGN PATENT DOCUMENTS 0235366 11/1986 European Pat. Off. .
2163523 2/1986 United Kingdom .

Primary Examiner—Mark Rosenbaum
Assistant Examiner—S. Thomas Hughes
Attorney, Agent, or Firm—Burns, Doane, Swecker & Mathis

[57] ABSTRACT

A device for mounting and/or dismounting a bearing on a shaft incorporating a tapered clamping sleeve between bearing and shaft and an arrangement for mutual axial displacement of the bearing and clamping sleeve in at least one axial direction, which arrangement incorporates at least one wedge-pointed screw arranged, when being screwed in towards the shaft to cause a mutual displacement in axial direction between the clamping sleeve and the bearing by wedge action. The bearing is situated in a surrounding sleeve-shaped member significant axial space beside the bearing at least on one side. The arrangement for displacement of bearing incorporates at least one radial flange, axially affixed to the clamping sleeve. The wedge-pointed screw is arranged to be screwed in substantially radially through holes in the bearing housing, for exerting the axial wedge force between the flange and an inner race ring of the bearings.

7 Claims, 3 Drawing Sheets

APPARATUS FOR MOUNTING AND DISMOUNTING BEARINGS

TECHNICAL FIELD

The present invention relates to a device for mounting and/or dismounting bearings on a shaft. The bearing is located in a sleeve-shaped member.

BACKGROUND OF THE INVENTION

Conventionally, bearing housings generally have been divided into two halves, which are interconnected upon mounting of the bearing on the shaft. This causes, i.e., the positioning of seals and lubricant to take place in situ at the mounting, which from many aspects, is not desirable. For this reason complete bearing units have been developed, wherein the bearing, clamping sleeve, seals and lubricant can be introduced in the bearing housing at the supplier's shop. The complete bearing unit then can be slid onto the intended shaft and the bearing is clamped to the shaft by tightening the clamping sleeve. Consequently, this construction requires use of a clamping sleeve. The clamping of the clamping sleeve acts, in a known manner, by wedge action between one or more taper surfaces at the clamping sleeve and the corresponding surfaces of the bearing. The wedge effect is created by the bearing and the clamping sleeve being displaced in axial direction relative to each other.

In Swedish Patent Application 8600310-0, an embodiment of such a solution is shown. The axial movement between the clamping sleeve and the bearing in that application is created by flanges equipped with axially extending screws, which act against the inner race ring of the bearing or against an intermediate washer. A mounting flange then is used at the small end of the tapering clamping sleeve, and a dismounting flange is used at the larger end thereof. In the embodiment of the prior application, it is possible to use an undivided bearing housing.

When the bearing unit is mounted to the shaft, screws are tightened which are parallel to the shaft and positioned at a somewhat larger diameter than the outer diameter thereof. The reverse procedure occurs at release of the bearing unit from the shaft. This means that axial space is required on both sides of the bearing unit for manipulating tools for mounting and dismounting. In many cases this can mean problems, and particularly on one side of the bearing unit. Several members are often positioned on the shaft between a first and a second bearing housing, whereas on the other hand a smaller number of components generally are positioned on the other side of the bearing housing toward the free side of the shaft end. At the initial mounting these components are not positioned as it must be possible to mount the bearing unit. There are however cases when components are hampering access also on this side. An example is when re-tightening of the mounting screws may be necessary.

Described in GB,A,2 163 523 is a locking sleeve having an extended portion, which on a shaft is positioned against the side face of a bearing race ring. The locking sleeve is provided with grub screws, which can be screwed in at an angle towards the shaft on which the bearing shall be fitted, or perpendicularly to the shaft when the screws are provided with tapering tips, and which screws with their ends can be screwed into a circumferential, angularly machined groove in the shaft. The tightening of the screws give an axial force displacing the bearing axially against a shoulder on the shaft, whereas at the same time the locking sleeve is locked to the shaft by the screws entering into the groove. This locking arrangement gives no loosening forces for releasing a wedge joint or a clamping sleeve, it requires a substantial space at least on one side of the bearing at the mounting and furthermore the deep groove machined in the shaft means a serious weakening of the shaft.

A purpose of the invention is to reduce the above-mentioned problems substantially by providing a device wherein dismounting and also mounting of a bearing unit can be accomplished without space being available at each side of the bearing unit.

SUMMARY OF THE INVENTION

The above-mentioned purpose is achieved by a device according to the present invention.

In accordance with the present invention, the sleeve-shaped member, which encloses the bearing, has threaded bores directed down towards the shaft. In these bores are screwed in wedge-pointed screws. These are designed so as to create a wedge action between the bearing and the clamping sleeve, such that the bearing and the clamping sleeve are urged apart axially. Thereby these wedge-pointed screws can be used for mounting or for dismounting. The wedge-pointed screw has a conically tapering end which is facing towards the shaft. In several embodiments, the wedge action is created in that this part cooperates on one hand with the bearing and on the other hand with the clamping sleeve or a part connected thereto. In other embodiments, the wedge action is effected in that the tapering portion cooperates with a tapering surface, which is connected either to the bearing or to the connecting sleeve and that a cylindrical part of the wedge-pointed screw following after the conically tapering part cooperates with a substantially planar surface connected to the bearing or to the clamping sleeve.

BRIEF DESCRIPTION OF THE DRAWINGS

Hereinafter the invention will be further described by embodiments with reference to the accompanying drawings, in which the same reference numerals in the different figures define parts corresponding to each other. In those cases where similar parts are used on both sides of the bearing they have on one side been designated with '-symbol, e.g., wedge-pointed screw 5'.

DESCRIPTION OF THE PREFERRED EMBODIMENTS

Figure 1:
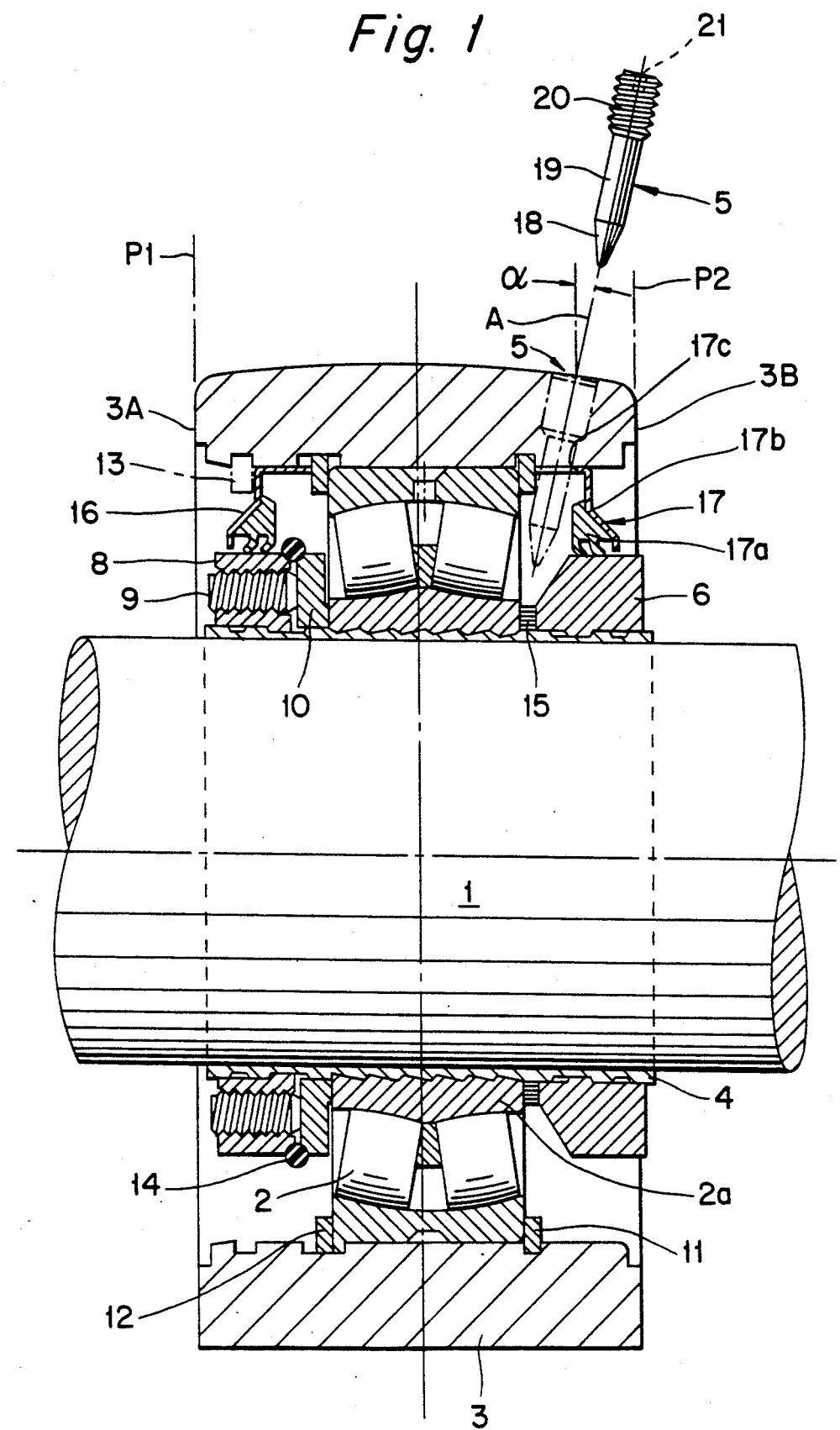
FIG. 1 is a cross-sectional view of a bearing unit according to the present invention. In order to create increased clarity, certain parts have been omitted in the lower part of the figure.

In FIG. 1, 1 designates a shaft and 2 a bearing fitted to the shaft 1 by a clamping sleeve 4. The bearing 2 in turn is fitted in a bearing housing 3. The bearing housing includes first and second axially spaced end surfaces 3A, 3B facing in opposite axial directions. The surfaces 3A, 3B are situated radially outwardly of the bearing 2 and define first and second end planes P1, P2. The fitting could also be made in a mounting sleeve, which is positioned later in a housing part. The clamping sleeve 4 has a series of tapering part surfaces acting against associated tapering part surfaces in the inner race ring of the bearing. In this embodiment, a thin tapering clamping sleeve can be used and the inner race ring of the bearing therefore will become thinner than it would have been if a conventional tapered clamping sleeve with one taper surface would have been used. The shown tapering clamping sleeve 4 is slotted over its entire length and it is therefore radially deformable to a maximum.

At both ends there are circumferential recesses in which two flanges 6, 8 fit. Upon mounting of the unit, gripping portions of each flange 6, 8 therefore may snap into the different recesses, when the clamping sleeve 4 is compressed. The flange 8 is a mounting flange, which is used for urging the bearing up on the tapering part surfaces. This is accomplished by tightening a number of screws 9 around the periphery of the mounting flange. The screws 9 press against a washer 10, which in turn engages the inner race ring 2a of the bearing 2. The washer 10 acts as a stop against the bearing and upon tightening of the screws 9, the tapering clamping sleeve 4 will be urged in the left direction in the figure, as it is attached to the mounting flange 8. As the clamping sleeve is slotted in its entire length, it will be compressed around the shaft 1, thereby locking the inner race ring 2a of the bearing to the shaft. The tapering "saw-tooth surfaces" of the clamping sleeve 4 have been produced by a rolling operation, which gives these tapering surfaces a much higher accuracy than what could have been achieved at a conventional clamping sleeve, which, e.g., has been turned out.

As the clamping sleeve 4 is slotted along its entire length there are seals 14, 15 preventing dirt from penetrating into the bearing. The seal 14 is a flexible rubber ring positioned such that it engages chamfers, which are made on the mounting flange 8 and the washer 10. The rubber ring 14 is lying between the washer 10 and the mounting flange 8 seen in the axial direction. Due to the elasticity, the rubber ring can absorb the changes in distance which occur between the washer and the mounting flange during mounting of the bearing. However, the clamping sleeve 4 may not be slotted over its entire length. The clamping sleeve 4 could, e.g., be uniform at one end. Then there could, e.g., be a bearing mounting nut screwed on.

When it is desired to loosen the bearing from the shaft 1, this is effected with aid of one or more wedge-pointed screws 5. The wedge-pointed screw 5 is screwed into a threaded screw access hole formed in the bearing housing 3 at a location disposed axially between the planes P1, P2. The wedge-pointed screw itself has at its upper end 20 a threaded portion and an attachment 21, e.g., in the form of an inner hexagon grip, for tightening with a tool. The other end 18 of the wedge-pointed screw is conically tapering. There is a cylindrical portion without thread, which interconnects the two ends of the screw. In a preferred embodiment, the upper portion 20 has a M6 thread and the cylindrical portion has an outer diameter of 4 mm. The transition section between the two diameters forms a smooth transitory portion having a radius of 1 mm. Due to this arrangement, it is possible that the wedge-pointed screw 5 may flex during load. The wedge-pointed screw is screwed in at an inclination angle $\alpha$ formed by an axis of rotation A of the screw and a line extending laterally through the bearing housing 3. The bearing 2 preferably lies in the plane of this line. In the example shown, the angle $\alpha = 13°$. The angle has been chosen primarily in order to avoid the wedge-pointed screw from coming in serious conflict with the adjacent locking ring 11 or an adjacent seal 17, respectively.

As the wedge-pointed screw 5 is screwed in, its tapering point at one hand will engage the inner race ring of the bearing 2 and on the other hand a tapering loosening flange 6 at a location axially between planes P1, P2. The tapering point 18 of the wedge-pointed screw thus will pierce as a wedge between the inner race ring of the bearing and the tapering loosening flange 6, so that they are forced apart. The number of wedge-pointed screws 5 can be varied. If a single wedge-pointed screw is used, this shall first be tightened in one position, whereupon it is loosened, the shaft is rotated and it is again tightened in another position. It is thereby possible to accomplish a correct pushing apart of bearing and clamping sleeve by aid of a single wedge-pointed screw. If two or more wedge-pointed screws are used, it is possible to effect the loosening by tightening all screws gradually. For certain applications then, circumferentially evenly spaced screws, e.g., three, are preferred. It is more difficult to make the distribution of screws in a bearing housing than in a round sleeve.

In the embodiment shown, the taper angle is adapted so that the flank of the conical surface 18 of the wedge-pointed screw 5, which is closest to the bearing is parallel to the side of the bearing. This means that the total taper angle of the wedge-pointed screw is about twice $\alpha$, i.e., in the illustrated embodiment about 26°. Furthermore, the conical surface of the tapering loosening flange 6, which is turned towards the bearing, is about parallel to its adjacent flank of the conical surface 18 of the wedge-pointed screw 5. This means that this surface in this case is inclined 26° relative to a line through the plane of extension of the tapering loosening flange 6. If the bearing is not tilted in the housing 3 this line is parallel to a line laterally through the bearing housing 3. However, it is also possible to give the tapering surface of the loosening flange 6 a somewhat larger angle than the 26°, which gives parallelity in this case. The contact between wedge-pointed screw 5 and loosening flange 6 thereby will occur at a smaller diameter, which could give a somewhat improved contact relation between the wedge-pointed screw 5 and the tapering loosening flange 6.

As can be seen in FIG. 1, the wedge-pointed screw 5 may be in conflict with the locking ring 11 or the seal 17, respectively. This potential problem is solved by positioning the locking ring so that its opening is situated at the wedge-pointed screw in those cases where one wedge-pointed screw is used. If several wedge-pointed screws are used, the geometry must be such that the thicker, threaded portion 20 of the wedge-pointed screw will not engage the locking ring 11 until at a late stage of its tightening motion. Thereby the locking ring 11 cannot prevent the loosening of the bearing from the shaft. If certain damages on the other hand should appear on the locking ring, this is not significant. Upon dismounting the bearing unit, replacement of the locking ring can take place.

The seal 17 consists of an inner elastomer portion 17 having one or more sealing lips 17a. The elastomer portion is fitted to a sheet metal ring 17b, which is pressed sealingly into the bearing housing 3. In the cylindrical portion of the sheet metal ring 17b there are stamped out holes 17c through which the entire wedge-pointed screw can penetrate. It is normally possible for the threaded portion 20 of the wedge-pointed screw to extend through the different holes. Between the bearing 2 and the tapering loosening flange 6 there is a sealing member 15, which is compressible, so that the bearing inner race ring 2a can be displaced axially when mounted on the clamping sleeve 4. The bearing members within the bearing can have small relative movement relative to the inner and outer races due to the construction of the bearing. The member 15 also acts as a seal between the bearing and the tapering loosening flange. This seal is advisable in view of dirt, which penetrates via the slotted clamping sleeve 4. The member 15 furthermore causes the tapering loosening flange to be carried along so that it rotates with the clamping sleeve 4 and thereby with the shaft 1.

In the lower half of FIG. 1 certain parts, such as seals and locking rings, have been omitted. This has been done in order to increase the clarity and to more clearly illustrate variations of bearing attachment and sealing of the bearing. In the seal arrangement shown at the upper part of the picture there are two radial seals 16, 17, which act against the mounting flange 8 and against the tapering loosening flange 6, respectively. These seals of course extend all around the periphery and they will, for this alternative, also be present in the lower part of the picture. They have been omitted in the lower portion of FIG. 1 for illustration reasons only. Axially beside the seal 16 there is a locking ring 13. It is shown in broken lines, as it is either mounted or omitted. In the cases where it is mounted, the bearing is kept axially locked by means of this locking ring 13. This is referred to as a locating bearing arrangement. If, however, the locking ring 13 is omitted, the bearing 2 can be axially displaced within certain limits before its motion is restricted by the locking ring 12. This is named a free bearing arrangement. A shaft is normally supported by a locating bearing and a free bearing. Thereby no bearing loads will occur when, during temperature variations, the shaft 1 alters its length.

Within the scope of the invention a plurality of different sealing arrangements can be used. In certain cases there may not be required any seal at all, which corresponds to the free bearing embodiment shown in the lower part of FIG. 1. Then the bearing unit should, e.g., be positioned in an installation, wherein bearing lubrication is satisfied in another manner. Furthermore the bearing may be of a so-called sealed type. This means that the bearing is equipped with seals at both sides and is lubricated for life. In this case the bearing is sealed off and then the seals 14 and 15 are not required.

When the wedge-pointed screw 5 is tightened, the bearing inner race ring 2a due to wedge effect will be displaced to the left in the figure, whereas the tapering loosening flange will be displaced in the opposite direction. As the operating direction of the wedge-pointed screw is inclined against the inner race ring, the motion of the inner race ring will be larger than that for the loosening flange 6. In a case where the bearing is a locating bearing, i.e., the locking ring 13 is positioned, it is impossible for the outer race ring of the bearing to move laterally to an appreciable extent, when the wedge-pointed screw is tightened. The bearing type shown, a spherical roller bearing, has an axial clearance of 0.6–0.7 mm. If this distance of movement for the inner race ring in relation to the bearing outer race ring is sufficient for the clamping sleeve to come loose, then the locking ring 13 need not be loosened. Otherwise, it is necessary to loosen the locking ring 13, before the wedge-pointed screw 5 is tightened in order to loosen the clamping sleeve from the shaft. From convenience aspects, it thus can be an advantage if the wedge-pointed screw 5 gives a large axial motion to the loosening flange 6 and only a small motion to the inner race ring of the bearing.

It should be observed that the bearing unit can be used with all types of bearings, which shall be fitted to a shaft. The bearings thus can have highly varying axial bearing clearances.

In most cases when a bearing unit is mounted, there is space available in axial direction at one side of the shaft. It is possible, e.g., that the shaft fitted, e.g., with gear wheel is already mounted in another bearing housing and the complete bearing unit with bearing housing, bearing seals and clamping sleeve is mounted by being slid onto the shaft from the shaft end. Then there is plenty of space for tightening the set screws 9 for securing the bearing to the shaft. However, there may also be cases when the space is so small that it is difficult to tighten the set screws 9.

Figure 2:
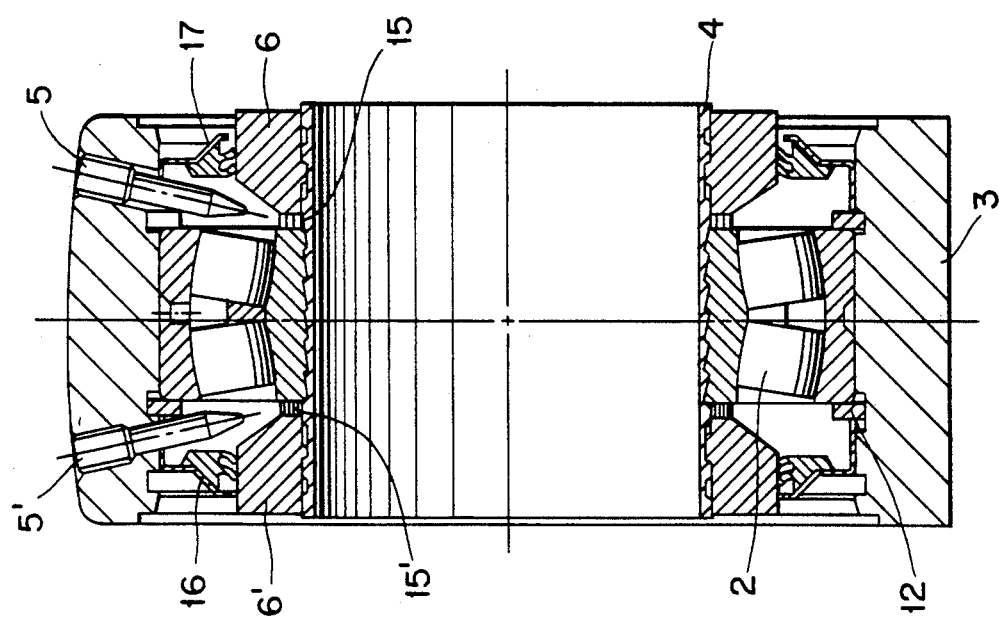
FIG. 2 is a view of a bearing unit similar to FIG. 1 in cross-section with another system for mounting the bearing on the shaft.

In this case, a solution in accordance with FIG. 2 could be used. Here, wedge-pointed screws 5' are used in combination with a tapering mounting flange 6' for locking the bearing to the shaft. In this case, it is appropriate to have at least two wedge-pointed screws 5' in order not to pull the clamping sleeve 4 to a tilted position. Otherwise, the same principles apply as for the solution according to FIG. 1, which means that a member 15 is used as the seal and for carrying along the loosening flange. This means that at mounting of the clamping sleeve on the shaft, the wedge-pointed screw 5' is tightened so that its tapering point enters between the bearing inner race ring and the tapering flange 6'. Thus, the tapering flange 6' and the bearing are pushed apart and the clamping sleeve is locked to the shaft. Before the installation is put into service, the wedge-pointed screws 5' then must be untightened, e.g., to the position shown in FIG. 2, or be completely removed. Therefore, the immobile screws will not contact the rotating flange 6' or rotating portions of the bearing. It is here presupposed that the conical surfaces of the bearing and the clamping sleeve have such a flat taper angle that they are safely self-locking in relation to each other. Otherwise, another type of locking is required.

By using wedge-pointed screws 5' also for mounting the clamping sleeve, it is possible to use flanges 6, 6' of smaller outer diameter. Hereby it is also possible to use smaller sealing members, which results in lower energy losses and lower costs. It is possible to use similar components on both sides of the bearing, which gives lower costs.

Figure 3:
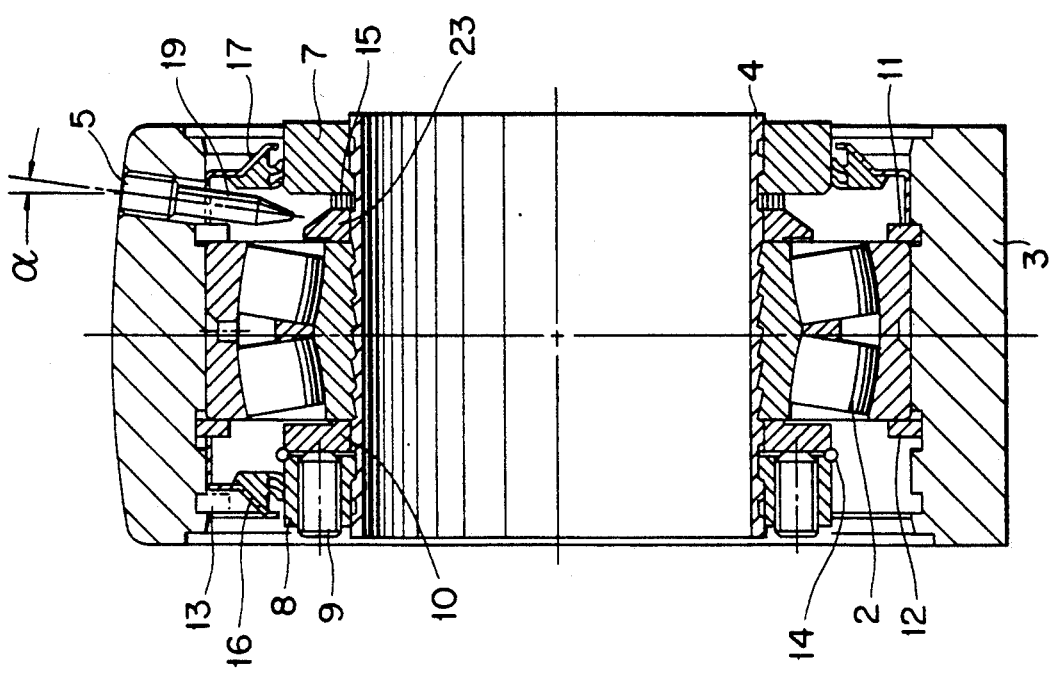
FIG. 3 is a cross-sectional view of an alternative solution from that in FIG. 1.

FIG. 3 shows a somewhat different variety of the bearing unit as compared to that according to FIG. 1. In this case the wedge-pointed screw 5 has a smaller angle $\alpha$, e.g., about 8°, which does not correspond to the angle of the plane of the bearing as shown in the figure. Furthermore, a planar loosening flange 7 is now used, which is axially locked to the clamping sleeve 4 in a manner similar to the loosening flange 6. A conical washer 23 has been inserted nearest to the bearing.

Thus, a further intermediate member has been added. Between the conical washer 23 and the loosening flange 7 there is in a similar arrangement as before including a member 15 for sealing and carrying along the loosening flange. In this embodiment, the wedge action operates somewhat differently than at the earlier described case. When the wedge-pointed screw 5 is screwed down, its somewhat rounded tip first engages the conical washer 23. Thereby the inner race ring of the bearing the clamping sleeve and the shaft will move as a unit in the left hand direction in the figure for a part or all of the axial play of the bearing. This side motion also causes the planar loosening flange 7 to travel to the left in the figure and thereby come to a rest against the wedge-pointed screw 5. This will take place on or near the cylindrical surface 19 of the wedge-pointed screw. The mode of operation thus is mainly that wedge action occurs by the wedge-pointed screw 5 acting against the conical washer 23 and that the planar loosening flange rests against the cylindrical surface 19 of the wedge-pointed screw. This means that there is normally no advance movement of the clamping sleeve 4 to the right in the figure. The entire loosening movement is instead effected by the inner race ring of the bearing being moved to the left in the figure. When tightening the wedge-pointed screw 5, it must also be recognized that the screw will deflect somewhat so that that its tip will move in a direction more straight downwards against the shaft, which can be of a certain advantage.

The solution according to FIG. 3 can also be modified in that the angle α is reduced further down to 0°. Then the wedge-pointed screw 5 is parallel to the plane of extension of the bearing. Also the flank of the surface 19 of the wedge-pointed screw will be parallel to the adjacent surface of the planar loosening flange 7, which may be a certain advantage.

Figure 4:
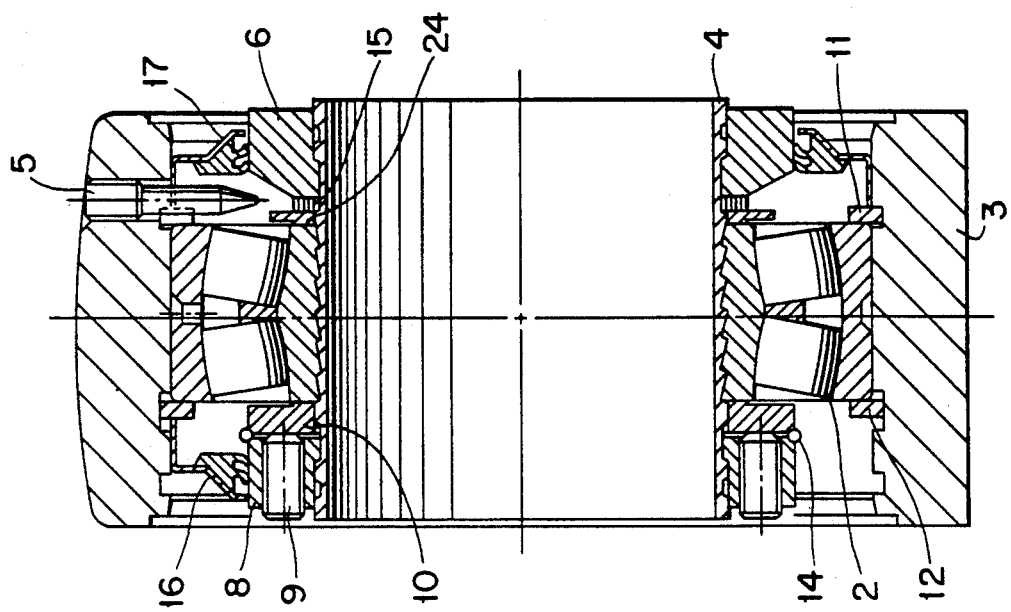
FIG. 4 is a view of a bearing unit, which is modified as compared to that of FIG. 1.

FIG. 4 shows a solution wherein the wedge-pointed screw 5 is screwed straight down, i.e., in parallel to the plane of extension of the bearing. Like the solution according to FIG. 1, a tapering loosening flange 6 is used. Nearest to the bearing is provided a planar washer 24. Between the planar washer 24 and the loosening flange 6 is provided a member 15 for sealing and carrying along the loosening flange, in a manner as earlier described. When the wedge-pointed screw 5 is screwed down, its tapering surface 18 will cooperate with the conical surface of the loosening flange 6, and the cylindrical surface 19 of the wedge-pointed screw will cooperate with the planar washer 24. Hereby is created a wedge effect, where mainly the entire advance movement occurs in that the clamping sleeve 4 is moved to the right in the figure. This is particularly desirable for locating bearing applications, as the bearing then can be loosened from the shaft in a safe manner without the need of first removing the locking ring 13.

Similar to what is shown in FIG. 2, the solution according to FIG. 4 can be transformed so that wedge-pointed screws 5' on the left side of the bearing are used for fitting the bearing to the shaft. In this arrangement, a planar washer is also positioned at the left side of the bearing and nearest thereafter a member for sealing and carrying along the loosening flange, and at the end a conical loosening flange 6'. When affixing the clamping sleeve 4 to the shaft by, e.g., set screws 5', it is particularly advantageous that the entire advance movement occurs by the clamping sleeve 4 being moved to the left in the figure. Hereby it is safely avoided that the bearing is subjected to squeezing in axial direction. In certain cases, this could occur when used with wedge-pointed screws for mounting the bearing to the shaft.

Figure 5:
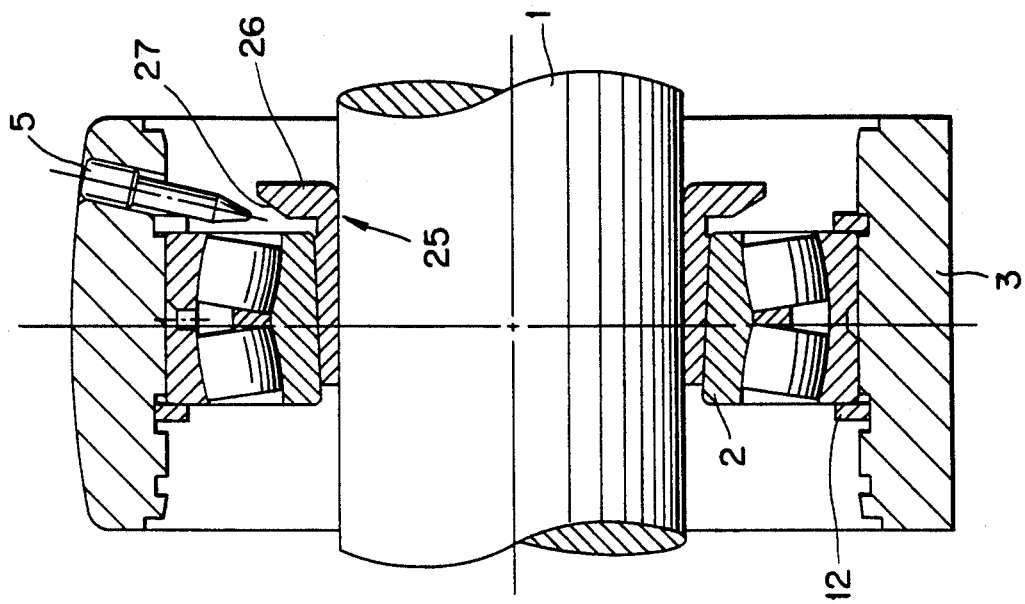
FIG. 5 is a view of a further alternate solution with another type of clamping sleeve.

FIG. 5 shows a solution where the bearing is mounted by means of a more conventional clamping sleeve 25. Normally this is not slotted but solid. Outside its larger end the tapering clamping sleeve is provided with a radially projecting flange portion 26. This larger end is designed with a tapering surface 27, which is facing the bearing. One or more wedge-pointed screws 5 are screwed down so that the tapering surface 18 will wedge between the tapering surface 27 of the flange portion 26 and the end surface of the inner race ring of the bearing. Hereby the inner part of the bearing and the clamping sleeve 25 will be pushed apart in an axial direction. The geometry is similar to the one used in FIG. 1, and thereby the advance movement also will occur mainly at the inner race ring of the bearing but also to a great extent at the clamping sleeve. Similar to what applies for the other solutions also, this solution can be designed so that wedge-pointed screws 5 can be located at the opposite side of the bearing and be used for fitting the bearing to the shaft. When wedge shaped screws are used at both ends, the tapering clamping sleeve 25 must be extended at the end opposed to the flange portion 26. This extension shall have a diameter less than the smallest inner diameter of the bearing so that mounting is possible.

The principles, preferred embodiments and mode of operation have been described in the foregoing. Variations and changes may be made that fall within the scope of the claims appended hereto.

I claim:

1. A device for mounting and/or dismounting a bearing on a shaft having a longitudinal axis, comprising a tapered clamping sleeve provided between the bearing and the shaft, the bearing having inner and outer races; displacing means for effecting relative axial displacement between the bearing and clamping sleeve in at least one axial direction, said displacing means including at least one wedge-pointed screw arranged, when being screwed in towards the shaft, to produce a relative displacement in the axial direction between the clamping sleeve and the bearing by wedge action; the bearing being situated in a bearing housing surrounding the outer race, the bearing housing including first and second axially spaced end surfaces facing in opposite axial directions, the first and second end surfaces situated radially outwardly of the bearing and defining first and second end planes oriented substantially perpendicular to the shaft axis; the displacing means further including a flange axially affixed to the clamping sleeve and projecting radially therefrom; the at least one wedge-pointed screw being arranged to be screwed about an axis of rotation extending non-parallel to said shaft; said at least one wedge-pointed screw including radial inner and outer ends, said radial inner end being wedge-pointed and arranged to exert said axial wedge force between the flange and the inner race of the bearing at a location disposed axially between said first and second end planes; said axis of rotation coinciding with an axis of a screw access hole formed in said outer housing at a location disposed axially between said first and second end planes.

2. A device according to claim 1, wherein the at least one wedge-pointed screw has a conically tapering end portion and an externally threaded portion at its opposite end, said opposite end having an attachment for a tool, the conically tapering end of the at least one wedge-pointed screw engaging a tapering contact surface on said flange.

3. A device according to claim 1, wherein the at least one wedge-pointed screw has a conically tapering end portion, a cylindrical portion extending therefrom, and an externally threaded portion extending from the cylindrical portion, said at least one screw having an attachment for a tool at one end thereof, the conically tapering end of the at least one wedge-pointed screw engaging a tapering contact surface on said flange and said cylindrical portion of the at least one wedge-pointed engaging a substantially planar surface on one of said bearing and said sleeve.

4. A device according to claim 1, wherein the flange and the clamping sleeve are made as an integral member.

5. A device according to claim 1, further comprising an intermediate member provided between the inner race of the bearing and the flange, the at least one wedge-pointed screw acting on said intermediate member.

6. A device according to claim 1, wherein the flange constitutes a first flange, and the hole constitutes a first screw access hole, and further including a second flange axially affixed to the clamping sleeve such that the first and second flanges are situated on opposite axial sides of the bearing; a second screw access hole formed in the bearing housing such that the first and second screw access holes are situated on opposite axial sides of the bearing; the at least one wedge-pointed screw comprising first and second wedge-pointed screws, the first wedge-pointed screw being arranged to be screwed into the first screw access hole for exerting an axial wedge force between the first flange and the inner ring, and the second wedge-pointed screw being arranged to be screwed into the second screw access hole for exerting an axial wedge force between the second flange and the inner ring.

7. A device according to claim 1 further including a washer abutting against an axially outwardly facing side of said bearing, said radial inner end of said wedge-pointed screw directly engaging said washer for exerting said axial wedge force indirectly to said bearing.

* * * * *